G. MOSMAN.
MEAT CUTTER.

No. 87,961. Patented Mar. 16, 1869.

Witnesses.
P. J. Dodge.
L. Hailer.

Inventor:
G. Mosman.
by Dodge & Munn
his Attys.

GARDNER MOSMAN, OF BOSTON, MASSACHUSETTS.

Letters Patent No. 87,961, dated March 16, 1869; antedated March 4, 1869.

IMPROVED MEAT-CUTTER.

The Schedule referred to in these Letters Patent and making part of the same.

*To all whom it may concern:*

Be it known that I, GARDNER MOSMAN, of Boston, in the county of Suffolk, and State of Massachusetts, have invented certain new and useful Improvements in Meat-Cutters; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My machine is designed for cutting up meat into fine particles, or pieces, for mince-meat, sausage-meat, &c., and is intended for all places where meat-cutters are to be used, as they may be made of any size, from a small hand-machine for family-use, up to the large "power"-machine for butchers and manufacturers.

In the accompanying drawing—

My machine consists of a heavy cylinder, armed with cutting-teeth, mounted within a suitable frame, or case, which case is provided with a hopper above the cylinder, in which hopper the meat to be cut is placed, and fed down upon the cutting-cylinder; also, in the arrangement of a concave, armed with cutting-teeth, inside of the box, or case, on one side of the cylinder, in such a position that the teeth on the cylinder shall, when it revolves, pass down between those on the concave, and thus cut fine the meat brought between the two; and, further, in a novel arrangement of the parts of the machine, so that the cylinder may be quickly removed, when desired.

A A' represent the case, or box, made rectangular, and very strong.

Within this case, near the centre, I place the cylinder C, running on the journals F F, and having secured to its outer surface the iron plates or bars E, which bars have attached to them, in straight rows, a series of knives or cutters, $e\ e$.

On one side of this cylinder, I secure a semicircular concave, D, at a distance, giving a little more space between it and the cylinder than is required for the passage of the knives $e$; and on the inside of this concave, at short distances apart, I secure metal plates, H, having on them straight rows of cutting-teeth, $i\ i$, similar to the teeth $e$, but with their cutting-faces standing in the opposite direction.

And above the cylinder, I make an opening in the top of the case, and place over or around it a hopper, B, and inside of the case secure a ledge, or board, $h$, extending down in line with the cutters, this being for the purpose of preventing any meat fed into the hopper from falling over on the back side of the cylinder, and thus passing through the machine uncut.

For cutting up very large pieces, preparatory to the cutters $e\ e$ and $i\ i$ operating upon them, I place, near the upper edge of the concave, a long stationary blade, or knife, $j$, extending entirely across the machine horizontally, and coming nearly in contact with the knives on the cylinder, so that any large bodies of meat fed into the machine will be divided up into smaller ones previous to the smaller cutters operating upon it.

It will be observed that a section out of one of the upper corners of the box, reaching as far down as the journals F F, is hinged at $a$, and may be turned back on said hinge, (the hopper having been previously taken off,) and the cylinder removed for the purpose of cleaning or repairing it, the hinged section being fastened down by hooks, or other suitable devices.

Figure 1:
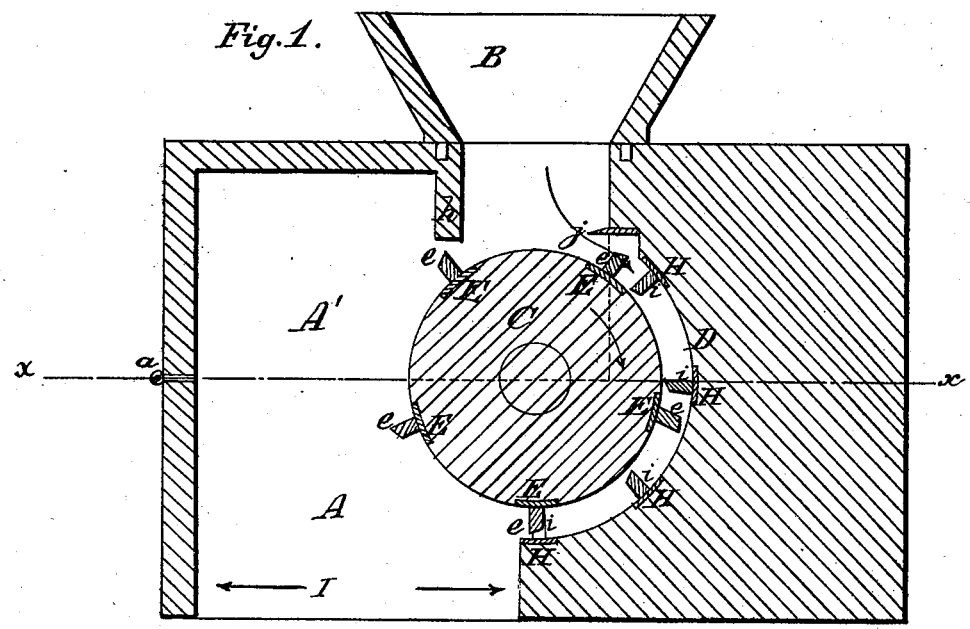
Figure 1 is a longitudinal vertical section through the centre.
Figure 2:
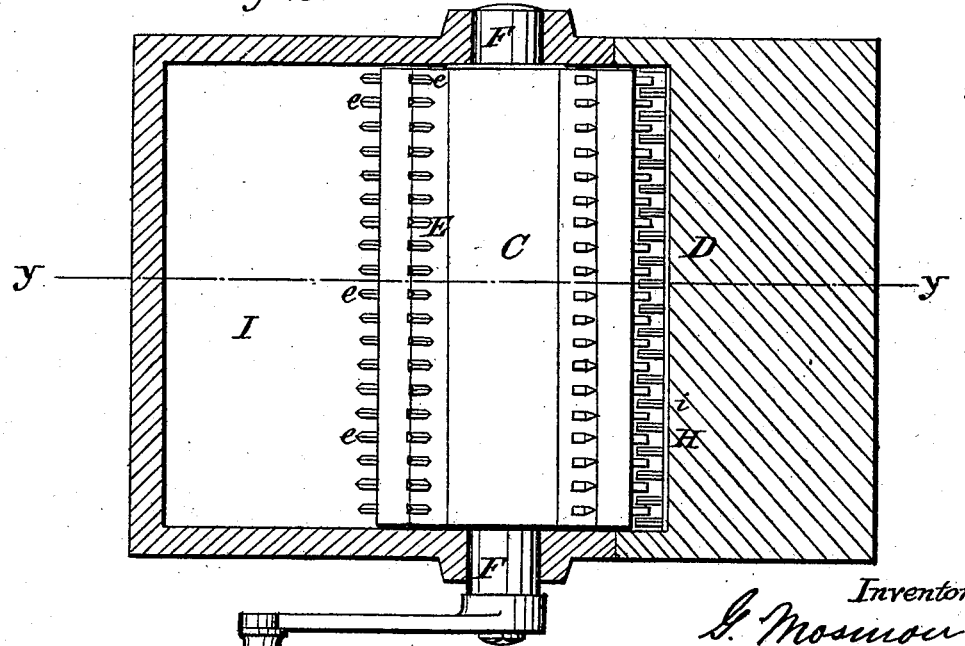
Figure 2 is a horizontal section on the line $x\ x$ of fig. 1.

My machine, being thus constructed, operates as follows:

The cylinder is made to revolve in the direction indicated by the black arrow in fig. 1, and the meat placed in the hopper, from whence it will work down upon the cylinder, be carried over, divided by knife $j$, and then carried down between the cylinder and concave, as indicated by the red arrow, where it is cut into very small particles, and passes out, through the opening I, into any receptacle placed beneath.

This machine I find, by actual use, to be superior in many respects to those now in the market, especially such as have the cutters arranged spirally, as they, in particular, have many objectionable features.

As my cutters are attached to detachable plates, they may be quickly replaced by new ones, when broken, or removed for repairs. And by the use of the knife $j$, much larger pieces of meat can be operated upon than with the old style of machine.

It is obvious that when other than hand-power is to be used, the crank G may be replaced by a pulley, or used in addition thereto; and also, that where the meat is required very fine, a second cylinder may be placed below the first.

Having thus fully described my invention,

What I claim, is—

A meat-cutting machine, consisting of the case A, having the concave D, provided with the knives $i$ and the horizontal cutter $j$, and the cylinder C, provided with the knives $e$, all constructed and arranged to operate substantially as shown and described.

GARDNER MOSMAN.

Witnesses:
MARK H. DURGIN,
CHAS. E. RUSS.